United States Patent
Chang

(10) Patent No.: US 9,686,638 B2
(45) Date of Patent: Jun. 20, 2017

(54) INPUT DEVICE HAVING BLUETOOTH MODULE AND OPERATION METHOD THEREFOR

(71) Applicant: DEXIN CORPORATION, New Taipei (TW)

(72) Inventor: Yuan Jung Chang, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 15/045,806

(22) Filed: Feb. 17, 2016

(65) Prior Publication Data

US 2017/0013393 A1 Jan. 12, 2017

(30) Foreign Application Priority Data

Jul. 6, 2015 (TW) .............................. 104121830 A

(51) Int. Cl.
| | |
|---|---|
| H04B 7/00 | (2006.01) |
| H04W 24/00 | (2009.01) |
| H04M 1/00 | (2006.01) |
| H04W 4/00 | (2009.01) |
| H04W 76/02 | (2009.01) |
| H04W 4/02 | (2009.01) |

(52) U.S. Cl.
CPC ......... *H04W 4/008* (2013.01); *H04W 76/023* (2013.01); *H04W 4/027* (2013.01)

(58) Field of Classification Search
CPC ........... H04B 5/00; H04B 7/00; H04W 4/008; H04W 88/02; H04M 1/7253
USPC .... 455/41.1, 41.2, 41.3, 552.1, 553.1, 456.1
See application file for complete search history.

(56) References Cited

U.S. PATENT DOCUMENTS

| | | | | |
|---|---|---|---|---|
| 8,606,181 B2 * | 12/2013 | Hsia | ................... | H04L 63/0869 455/41.2 |
| 8,750,799 B2 * | 6/2014 | Giles | ................... | H04W 4/206 455/41.2 |

(Continued)

FOREIGN PATENT DOCUMENTS

| | | |
|---|---|---|
| CN | 103733614 | 4/2014 |
| TW | M479449 | 6/2014 |

OTHER PUBLICATIONS

Office Action issued by the Taiwan Intellectual Property Office on Feb. 25, 2016.

*Primary Examiner* — Quochien B Vuong
(74) *Attorney, Agent, or Firm* — I P & T Group LLP

(57) ABSTRACT

Disclosed is an operation method for an input device having a Bluetooth module, where the input device is a peripheral device of a computer. The operation method includes the following steps: a Bluetooth module of the input device connecting to and communicating with a Bluetooth module of a smart watch or a smart phone via a Bluetooth communication protocol; when the input device and the smart watch or the smart phone are close and perform a same operation, the Bluetooth module of the input device receiving data via the Bluetooth module of the smart watch or the smart phone, where the data is produced when an operation of the smart watch or the smart phone is sensed by at least one sensor of the smart watch or the smart phone; and a microprocessor of the input device storing the data received by the Bluetooth module of the input device in a memory of the input device.

8 Claims, 4 Drawing Sheets

(56) References Cited

U.S. PATENT DOCUMENTS

| | | | | |
|---|---|---|---|---|
| 8,750,832 B2* | 6/2014 | Wuergler | .............. | H04W 4/046 |
| | | | | 455/41.1 |
| 9,002,275 B2* | 4/2015 | Tubbesing | ............ | H04W 4/008 |
| | | | | 455/41.2 |
| 2010/0302165 A1 | 12/2010 | Li | | |
| 2014/0113562 A1* | 4/2014 | Lee | ................ | H04W 8/005 |
| | | | | 455/41.2 |
| 2014/0273845 A1* | 9/2014 | Russell | .............. | H04W 76/023 |
| | | | | 455/41.2 |

* cited by examiner

INPUT DEVICE HAVING BLUETOOTH MODULE AND OPERATION METHOD THEREFOR

The present application claims priority of Taiwanese Patent Application No. 104121830, filed on Jul. 6, 2015, which is incorporated herein by reference in its entirety.

BACKGROUND

Technical Field

The present invention relates to the field of computer technologies, and in particular, to an input device having a Bluetooth module and an operation method therefor.

Related Art

With the advancement of technologies, a computer has become a part of life. People almost need to rely on the computer both in work and in entertainment. In the current society, a computer and a peripheral input device thereof, even, have become a part of daily life of every person. Moreover, for a computer operation, an input device connected to a computer device may enable a user to communicate with the computer device, and further, enables the user to operate the computer device conveniently. Therefore, the input device plays a necessary role in communication between the user and the computer device.

A mouse, a keyboard, a game joystick, and the like are common input devices. For users, the input device brings great convenience to people when they operate a computer, such as, scrolling a screen, selecting an object, and inputting an instruction. Among various input devices, a utilization rate of the mouse is especially high. It is mainly because the mouse is a basic bridge linking a computer to a user. Therefore, it is self-evident that the mouse is important.

In addition, in entertainment, a computer may also be used by a user to play a computer game in leisure time. When playing the computer game, the user mostly needs to use input devices, such as a mouse and a keyboard, to control the game to proceed. To enable the user to operate the input device more conveniently and faster during a game, during installment of a software driver, data corresponding to the game, such as a shortcut instruction, a resolution, and an acceleration G value, will be preset. However, the preset data does not match a use habit of the user of the input device. As a result, the user still fails to use the input device smoothly. Even worse, the input device cannot acquire the use habit of the user to further set data, such as a shortcut instruction, a resolution, and an acceleration G value, in the software driver.

SUMMARY

In view of the foregoing problem, an objective of the present invention is to provide an input device having a Bluetooth module and an operation method therefor. When an input device and a smart watch or a smart phone are close and perform a same operation, the input device receives data via a Bluetooth module, where the data is produced when an operation of the smart watch or the smart phone is sensed by a sensor of the smart watch or the smart phone; and the data is used as data of a use habit of a user. Moreover, during installment of the input device, a software driver provides a graphic operation interface, so that the user may set data, such as a specific key, a resolution, and an acceleration G value, according to data of the use habit of the user.

A first aspect of the present invention provides an input device having a Bluetooth module, which is a peripheral device of a computer, including:

a Bluetooth module, configured to connect to and communicate with a Bluetooth module of a smart watch or a smart phone via a Bluetooth communication protocol;

a microprocessor, configured to control the Bluetooth module of the input device to connect to and communicate with the Bluetooth module of the smart watch or the smart phone; and a memory, where the microprocessor stores in the memory the data sent by the Bluetooth module of the smart watch or the smart phone and received by the Bluetooth module of the input device, where when the input device and the smart watch or the smart phone are close and perform a same operation, the Bluetooth module of the input device receives data, where the data is produced when an operation of the smart watch or the smart phone is sensed by at least one sensor of the smart watch or the smart phone.

A second aspect of the present invention provides an operation method for an input device having a Bluetooth module, where the input device is a peripheral device of a computer, and the operation method includes the following steps:

a Bluetooth module of the input device connecting to and communicating with a Bluetooth module of a smart watch or a smart phone via a Bluetooth communication protocol;

when the input device and the smart watch or the smart phone are close and perform a same operation, the Bluetooth module of the input device receiving data via the Bluetooth module of the smart watch or the smart phone, where the data is produced when an operation of the smart watch or the smart phone is sensed by at least one sensor of the smart watch or the smart phone; and a microprocessor of the input device storing the data received by the Bluetooth module of the input device in a memory of the input device.

DETAILED DESCRIPTION

To enable a person of ordinary skill in the art to which the present invention belongs to further learn about the present invention, the following specially lists several preferred embodiments of the present invention, and illustrates constituent content of the present invention and the effects that the present invention is intended to achieve in detail with reference to the accompanying drawings.

Figure 1:
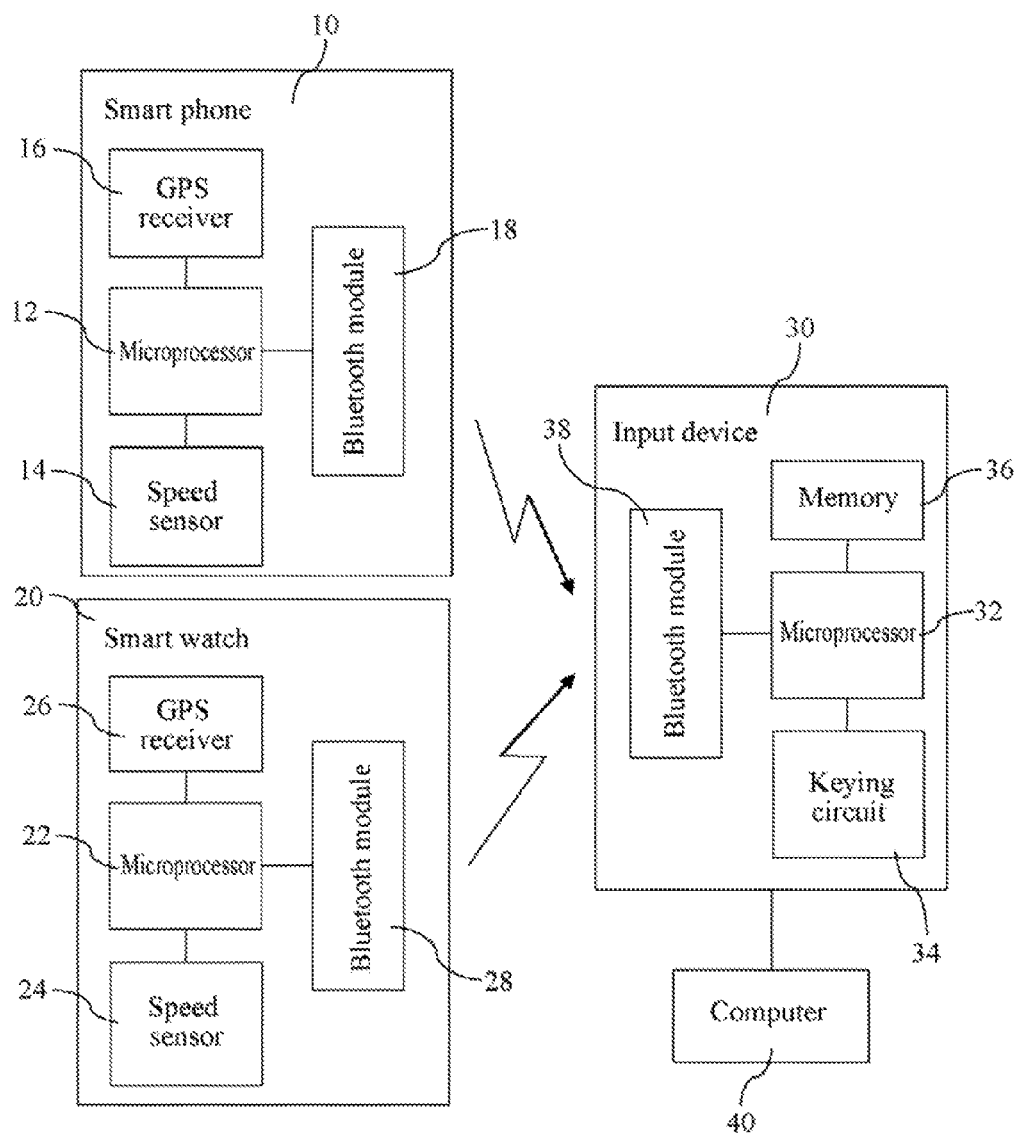
FIG. 1 is a block diagram of connection and communication between a smart phone and a smart watch and an input device according to the present invention.

FIG. 1 is a block diagram of connection and communication between a smart phone and a smart watch and an input device according to the present invention. In FIG. 1, a smart phone 10 includes a microprocessor 12, a speed sensor 14, a global positioning system (GPS) receiver 16, and a Bluetooth module 18; a smart watch 20 includes a microprocessor 22, a speed sensor 24, a GPS receiver 26, and a Bluetooth module 28; and an input device 30 connected to a computer 40 includes a microprocessor 32, a keying circuit 34, a memory 36, and a Bluetooth module 38.

The GPS receiver 16 of the smart phone 10 sends, to the microprocessor 12 of the smart phone 10, coordinate data of a position in which the smart phone 10 is currently located. By sensing a translational acceleration and a movement direction of the smart phone 10, the speed sensor 14 of the smart phone 10 produces an acceleration value and a movement direction value, and the microprocessor 12 of the smart phone 10 receives the acceleration value and the movement direction value. The microprocessor 12 of the smart phone 10 controls the Bluetooth module 18 to connect to and communicate with the Bluetooth module 38 of the input device 30, and sends the coordinate data, the acceleration value, and the movement direction value that are received by the microprocessor 12, and an identification code of the smart phone 10 to the input device 30 via the Bluetooth module 18.

The GPS receiver 26 of the smart watch 20 sends, to the microprocessor 22 of the smart watch 20, coordinate data of a position in which the smart watch 20 is currently located. By sensing a translational acceleration and a movement direction of the smart watch 20, the speed sensor 24 of the smart watch 20 produces an acceleration value and a movement direction value, and the microprocessor 22 of the smart watch 20 receives the acceleration value and the movement direction value. The microprocessor 22 of the smart watch 20 controls the Bluetooth module 28 to connect to and communicate with the Bluetooth module 38 of the input device 30, and sends the coordinate data, the acceleration value, and the movement direction value that are received by the microprocessor 22, and an identification code of the smart watch 20 to the input device 30 via the Bluetooth module 28.

The microprocessor 32 of the input device 30 controls the Bluetooth module 38 to connect to and communicate with the Bluetooth module 18 of the smart phone 10 or the Bluetooth module 28 of the smart watch 20, and the microprocessor 32 of the input device 30 receives the coordinate data, the acceleration value, the movement direction value, and the identification code of the smart phone 10 that are sent by the smart phone 10, or the coordinate data, the acceleration value, the movement direction value, and the identification code of the smart watch 20 that are sent by the smart watch 20 via the Bluetooth module 38.

The microprocessor 32 of the input device 30 stores, in the memory 36 of the input device 30, the received coordinate data, acceleration value, movement direction value, and identification code of the smart phone 10 that are sent by the smart phone 10, or the received coordinate data, acceleration value, movement direction value, and identification code of the smart watch 20 that are sent by the smart watch 20.

When the smart phone 10 or the smart watch 20 and the input device 30 are close, and the input device 30 and the smart phone 10 or the smart watch 20 perform a same operation, the input device 30 and the smart phone 10 or the smart watch 20 have similar translational accelerations and movement directions. Therefore, an acceleration value and a movement direction value of the smart phone 10 or the smart watch 20 are also similar to an acceleration value and a movement direction value of the input device 30. For example, the smart watch 20 is worn around a wrist, and when a mouse (that is, one of the input devices 30) is moved by a hand, the smart watch 20 on the wrist also moves as the hand moves. Therefore, the speed sensor 24 of the smart watch 20 senses a translational acceleration and a movement direction of the smart watch 20, and a sensed acceleration value and a sensed movement direction value of the smart watch 20 are similar to an acceleration value and a movement direction value of the input device 30.

The microprocessor 32 of the input device 30 receives, via the Bluetooth module 38, an acceleration value and a movement direction value that are sent by the smart phone 10 or the smart watch 20 as an acceleration value and a movement direction value of the input device 30, and stores the acceleration value and the movement direction value in the memory 36. The acceleration value and the movement direction value stored in the memory 36 may be used as statistical data of a use habit of a user of the input device 30. The statistical data may be sent to the computer 40 for the user to watch and analyze, and moreover, an internal parameter of the input device 30 may further be set according to the statistical data.

An identity of the user of the input device 30 may be acquired by the microprocessor 32 of the input device 30 according to the identification code sent by the smart phone 10 or the smart watch 20. Because different smart phones 10 or smart watches 20 have different identification codes, the microprocessor 32 of the input device 30 reads, from the memory 36, executive data corresponding to the identification code sent by the smart phone 10 or the smart watch 20, so that the input device 30 may perform an operation corresponding to the identity of the user. For example, it may be acquired by the microprocessor 32 of the input device 30 according to the identification code sent by the smart phone 10 or the smart watch 20 that, the identity of the user of the input device 30 is an adult, and when using the input device 30 to enter the computer 40 for an operation, the adult may use more functions of the input device 30, while a child may be prohibited from using some of functions of the input device 30.

In another example, some passwords are stored in the memory 36 of the input device 30, and each password is corresponding to the coordinate data and the identification code of the smart phone 10 that are sent by the smart phone 10, or the coordinate data and the identification code of the smart watch 20 that are sent by the smart watch 20. When the key (not shown) of the keying circuit 34 is pressed, the microprocessor 32 of the input device 30 reads, according to a key signal produced by the keying circuit 34, the password corresponding to the coordinate data and identification code sent by the smart phone 10 or the smart watch 20 from the memory 36, and the input device 30 enables an operational function corresponding to the password. For example, it may be acquired by the microprocessor 32 of the input device 30 from the coordinate data sent by the smart phone 10 or the smart watch 20 that the input device 30 is in an office, it may be acquired from the identification code that the user of the input device 30 is an office worker, and the microprocessor 32 of the input device 30 reads a password corresponding data of the office and the office worker from the memory 36, so as to enable a related function of the input device 30 operating the computer for office works; if it is acquired that the input device 30 is located in a house and the user is a computer game player, the microprocessor 32 of the input device 30 reads a password corresponding data of the house and the computer game player from the memory 36, so as to enable a related function of the input device 30 operating a computer for a computer game.

An operation method of an input device having a Bluetooth module in the following embodiments of the present invention is described with reference to the above block diagram of an input device having a Bluetooth module.

First Embodiment

Figure 2:
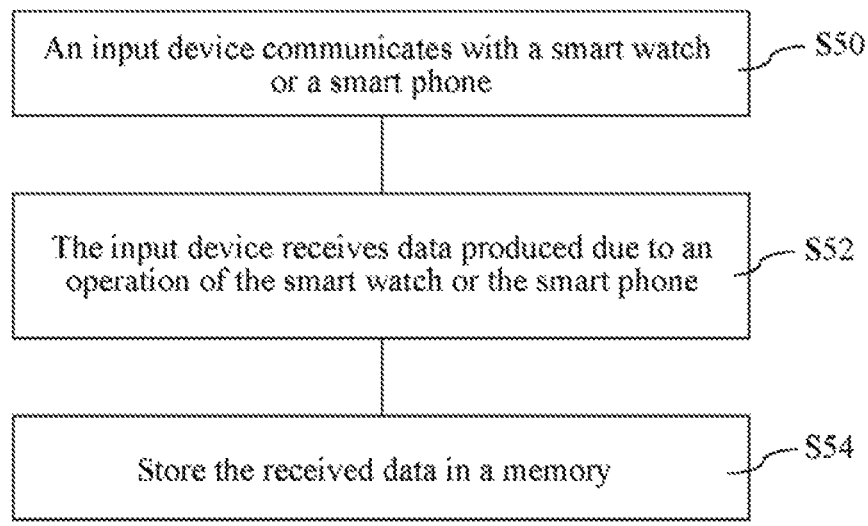
FIG. 2 is a flowchart of an operation method for an input device having a Bluetooth module according to a first embodiment of the present invention.

FIG. 2 is a flowchart of an operation method for an input device having a Bluetooth module according to a first embodiment of the present invention. In the first embodiment, a microprocessor 32 of an input device 30 controls a Bluetooth module 38 to connect to and communicate with a Bluetooth module 18 of a smart phone 10 or a Bluetooth module 28 of a smart watch 20 (step S50).

By sensing a translational acceleration and a movement direction of the smart phone 10, a speed sensor 14 of the smart phone 10 produces an acceleration value and a movement direction value, or sensing a translational acceleration and a movement direction of the smart watch 20, a speed sensor 24 of the smart watch 20 produces an acceleration value and a movement direction value, and a microprocessor 12 of the smart phone 10 or a microprocessor 22 of the smart watch 20 receives the acceleration value and the movement direction value.

When the smart phone 10 or the smart watch 20 and the input device 30 are close, and the input device 30 and the smart phone 10 or the smart watch 20 perform a same operation, the microprocessor 32 of the input device 30 receives, via the Bluetooth module 38, an acceleration value and a movement direction value that are sent by the microprocessor 12 of the smart phone 10 or the microprocessor 22 of the smart watch 20 as an acceleration value and a movement direction value of the input device 30 (step S52).

The microprocessor 12 of the smart phone 10 stores the received acceleration value and the movement direction value in the memory 36 (step S54). The acceleration value and the movement direction value stored in the memory 36 may be used as statistical data of a use habit of a user of the input device 30. The statistical data may be sent to a computer 40 for the user to watch and analyze, and moreover, an internal parameter of the input device 30 may further be set according to the statistical data.

Second Embodiment

Figure 3:
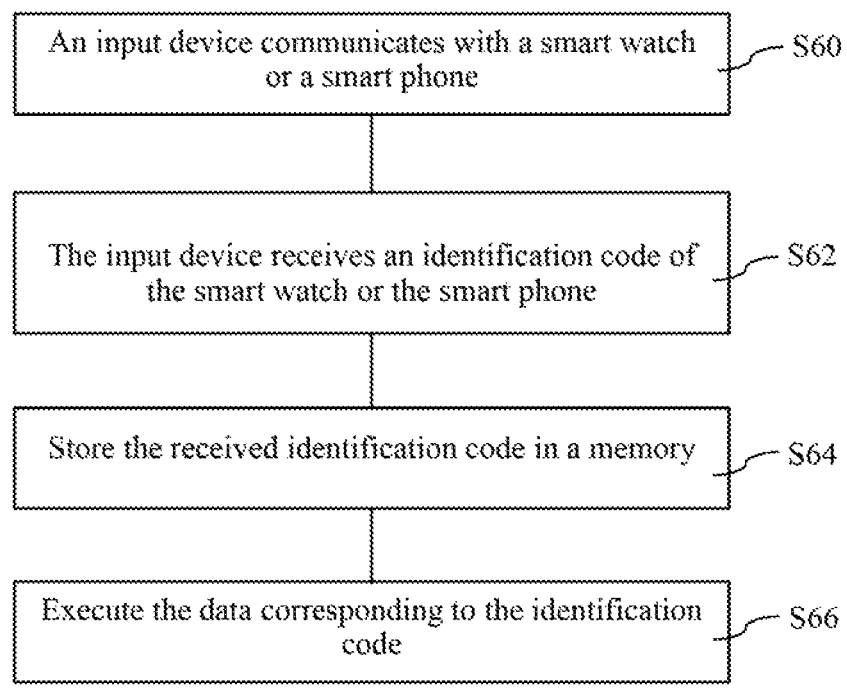
FIG. 3 is a flowchart of an operation method for an input device having a Bluetooth module according to a second embodiment of the present invention.

FIG. 3 is a flowchart of an operation method for an input device having a Bluetooth module according to a second embodiment of the present invention. In the second embodiment, a microprocessor 32 of an input device 30 controls a Bluetooth module 38 to connect to and communicate with a Bluetooth module 18 of a smart phone 10 or a Bluetooth module 28 of a smart watch 20 (step S60).

The smart phone 10 or the smart watch 20 has an identification code, and a microprocessor 12 of the smart phone 10 sends the identification code of the smart phone 10 to the input device 30 via the Bluetooth module 18, or a microprocessor 22 of the smart watch 20 sends the identification code of the smart watch 20 to the input device 30 via the Bluetooth module 28.

When the smart phone 10 or the smart watch 20 and the input device 30 are close, the microprocessor 32 of the input device 30 receives the identification code sent by the microprocessor 12 of the smart phone 10 or the microprocessor 22 of the smart watch 20 via the Bluetooth module 38 (step S62).

The microprocessor 12 of the smart phone 10 stores the received identification code in the memory 36 (step S64). An identity of a user of the input device 30 may be acquired by the microprocessor 32 of the input device 30 according to the identification code sent by the smart phone 10 or the smart watch 20. Because different smart phones 10 or smart watches 20 have different identification codes, the microprocessor 32 of the input device 30 reads, from the memory 36, executive data corresponding to the identification code sent by the smart phone 10 or the smart watch 20, so that the input device 30 may perform the foregoing operation corresponding to the identity of the user (step S66).

Third Embodiment

Figure 4:
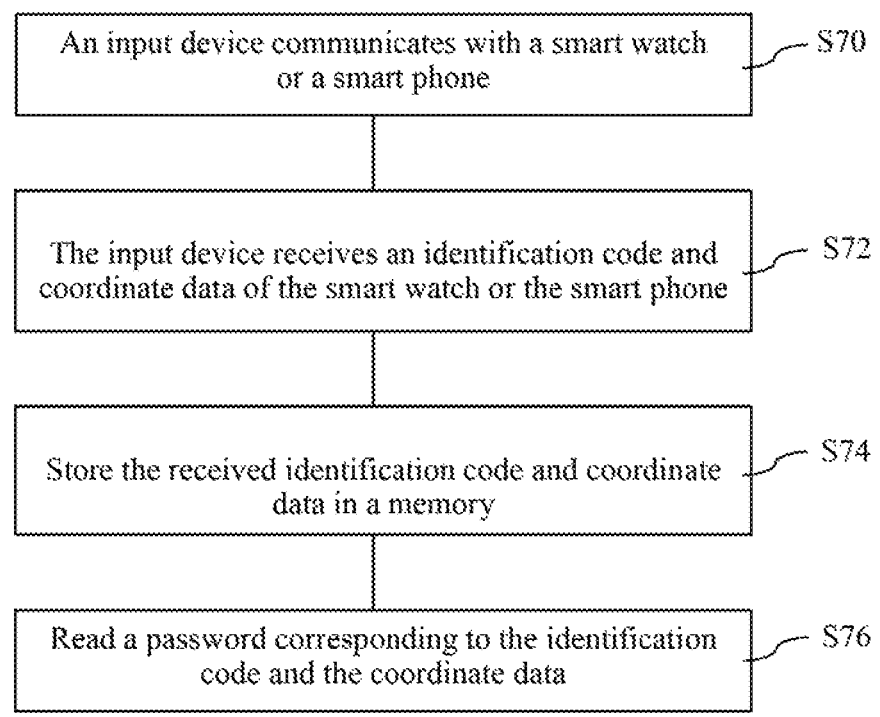
FIG. 4 is a flowchart of an operation method for an input device having a Bluetooth module according to a third embodiment of the present invention.

FIG. 4 is a flowchart of an operation method for an input device having a Bluetooth module according to a third embodiment of the present invention. In the third embodiment, a microprocessor 32 of an input device 30 controls a Bluetooth module 38 to connect to and communicate with a Bluetooth module 18 of a smart phone 10 or a Bluetooth module 28 of a smart watch 20 (step S70).

The smart phone 10 or the smart watch 20 has an identification code; a GPS receiver 16 of the smart phone 10 acquires coordinate data of a position in which the smart phone 10 is currently located, or a GPS receiver 26 of the smart watch 20 acquires coordinate data of a position in which the smart watch 20 is currently located; and a microprocessor 12 of the smart phone 10 sends the identification code of the smart phone 10 and the coordinate data to the input device 30 via the Bluetooth module 18, or a microprocessor 22 of the smart watch 20 sends the identification code of the smart watch 20 and the coordinate data to the input device 30 via the Bluetooth module 28.

When the smart phone 10 or the smart watch 20 and the input device 30 are close, the microprocessor 32 of the input device 30 receives the identification code and the coordinate data sent by the microprocessor 12 of the smart phone 10 or the microprocessor 22 of the smart watch 20 via the Bluetooth module 38 (step S72).

The microprocessor 12 of the smart phone 10 stores the received identification code and coordinate data in the memory 36 (step S74). Several passwords are stored in the memory 36 of the input device 30, and each password is separately corresponding to the coordinate data and the identification code of the smart phone 10 that are sent by the smart phone 10, or the coordinate data and the identification code of the smart watch 20 that are sent by the smart watch 20. When a key (not shown) of a keying circuit 34 is pressed, the microprocessor 32 of the input device 30 reads from the memory 36, according to a key signal produced by the keying circuit 34, a password corresponding to the coordinate data and identification code sent by the smart phone 10 or the smart watch 20, and the input device 30 enables the foregoing operational function corresponding to the password (step S76).

The present invention provides an input device having a Bluetooth module and an operation method therefor. When an input device and a smart watch or a smart phone are close and perform a same operation, the input device receives data via a Bluetooth module, where the data is produced when an operation of the smart watch or the smart phone is sensed by a sensor of the smart watch or the smart phone; and the data is used as data of a use habit of a user. Moreover, during installment of the input device, a software driver provides a graphic operation interface, so that the user may set data such as a specific key, a resolution, and an acceleration G value according to data of the use habit of the user, and may implement a related function corresponding to an identification code and coordinates of the input device according to an identification code and coordinates of the smart watch or the smart phone.

Although reference is made to preferred specific embodiments in the present invention and the exemplary accompanying drawings are described as above, the specific embodiments and exemplary accompanying drawings should not be construed as a limitation. Any modification, omission, and variation made by a person skilled in the art on the shape of the invention and content of the embodiments shall not depart from the claimed scope of the claims of the present invention.

What is claimed is:

1. An input device having a Bluetooth module, which is a peripheral device of a computer, comprising:
    a Bluetooth module, configured to connect to and communicate with a Bluetooth module of a smart watch or a smart phone via a Bluetooth communication protocol;
    a microprocessor, configured to control the Bluetooth module of the input device to connect to and communicate with the Bluetooth module of the smart watch or the smart phone; and
    a memory, wherein the microprocessor stores, in the memory, data sent by the Bluetooth module of the smart watch or the smart phone and received by the Bluetooth module of the input device,
    wherein when the input device and the smart watch are close, or when the input device and the smart phone are close, and an operation performed on the input device is the same as the operation performed on the smart watch or the smart phone, the Bluetooth module of the input device receives data, wherein the data is produced when an operation of the smart watch or the smart phone is sensed by at least one sensor of the smart watch or the smart phone,
    wherein the data stored in the memory comprises an acceleration value and a movement direction value produced when a speed sensor of the smart watch or the smart phone senses a translational acceleration and a movement direction of the smart watch or the smart phone, coordinate data produced by a global positioning system (GPS) receiver of the smart watch or the smart phone according to a position in which the smart watch or the smart phone is currently located, and an identification code of the smart watch or the smart phone.

2. The input device according to claim 1, wherein the microprocessor receives the identification code sent by the smart watch or the smart phone via the Bluetooth module of the input device, and reads executive data corresponding to the identification code of the smart watch or the smart phone from the memory and executes the executive data.

3. The input device according to claim 1, wherein the microprocessor receives the identification code and the coordinate data sent by the smart watch or the smart phone via the Bluetooth module of the input device, and reads executive data corresponding to the identification code and the coordinate data of the smart watch or the smart phone from the memory and executes the executive data.

4. The input device according to claim 3, further comprising:
    a keying circuit, having a key,
    wherein the memory stores a password, and
    when the key of the keying circuit is pressed, the microprocessor reads the password corresponding to the identification code and the coordinate data of the smart watch or the smart phone from the memory.

5. An operation method for an input device having a Bluetooth module, wherein the input device is a peripheral device of a computer, and the operation method comprises the following steps:
    a Bluetooth module of the input device connecting to and communicating with a Bluetooth module of a smart watch or a smart phone via a Bluetooth communication protocol;
    when the input device and the smart watch are close, or when the input device and the smart phone are close, and an operation performed on the input device is the same as the operation performed on the smart watch or the smart phone, the Bluetooth module of the input device receiving data via the Bluetooth module of the smart watch or the smart phone, wherein the data is produced when an operation of the smart watch or the smart phone is sensed by at least one sensor of the smart watch or the smart phone; and
    a microprocessor of the input device storing the data received by the Bluetooth module of the input device in a memory of the input device,
    wherein the data stored in the memory comprises an acceleration value and a movement direction value produced when a speed sensor of the smart watch or the smart phone senses a translational acceleration and a movement direction of the smart watch or the smart phone, coordinate data produced by a global positioning system (GPS) receiver of the smart watch or the smart phone according to a position in which the smart watch or the smart phone is currently located, and an identification code of the smart watch or the smart phone.

6. The operation method according to claim 5, after the step of storing, by the microprocessor, the data received by the Bluetooth module of the input device in the memory, further comprising the following step: the microprocessor reading executive data corresponding to the identification code of the smart watch or the smart phone from the memory and executing the executive data.

7. The operation method according to claim 5, after the step of storing, by the microprocessor, the data received by the Bluetooth module of the input device in the memory, further comprising the following step: the microprocessor reading executive data corresponding to the identification code and the coordinate data of the smart watch or the smart phone from the memory and executing the executive data.

8. The operation method according to claim 7, wherein in the step of reading, by the microprocessor, the executive data corresponding to the identification code and the coordinate data of the smart watch or the smart phone from the memory and executing the executive data, when a key of a keying circuit of the input device is pressed, the microprocessor reads a password corresponding to the identification code and the coordinate data of the smart watch or the smart phone from the memory.

* * * * *